(12) United States Patent
Suwa

(10) Patent No.: US 6,397,723 B1
(45) Date of Patent: Jun. 4, 2002

(54) NEGATIVE PRESSURE BOOSTER

(75) Inventor: Toshiyuki Suwa, Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 09/645,327

(22) Filed: Aug. 25, 2000

(30) Foreign Application Priority Data

Oct. 5, 1999 (JP) .......................................... 11-284255

(51) Int. Cl.[7] ................................................ F15B 9/10
(52) U.S. Cl. .................................................... 91/369.2
(58) Field of Search ............................ 91/369.2, 369.3, 91/376 R

(56) References Cited

U.S. PATENT DOCUMENTS 5,884,548 A * 3/1999 Ando et al. ................. 91/369.2

FOREIGN PATENT DOCUMENTS

| JP | 10-100887 | | 4/1998 |
|---|---|---|---|
| JP | 11129890 A | * | 5/1999 |

* cited by examiner

Primary Examiner—Edward K. Look
Assistant Examiner—Thomas E. Lazo
(74) Attorney, Agent, or Firm—McGuireWoods LLP

(57) ABSTRACT

A negative pressure booster comprises a repulsion force mechanism 24 provided among a valve cylinder 10, a valve piston 18 and an output rod 25. The repulsion force mechanism 24 includes: a flexible piston 22 positioned between the valve cylinder 10 and the output rod 25; a repulsion force piston 17 positioned facing the flexible piston 22 on the side opposite the output rod 25 and having a smaller diameter than the flexible piston 22; and a spring 48 positioned between the repulsion force piston 17 and the valve piston 18 and imposing a setup load thereon in the direction of contraction. In the valve cylinder, there is provided a stopper 45 supporting the front end of the valve piston 18 before the limit of the contraction of the spring 48 is reached.

5 Claims, 4 Drawing Sheets

NEGATIVE PRESSURE BOOSTER

BACKGROUND OF THE INVENTION

1. Field of the Invention

The present invention relates to a negative pressure booster used for a toggle operation of a brake master cylinder of a motor vehicle. More particularly, the invention relates to an improvement for a negative pressure booster including: a booster shell; a booster piston which is accommodated inside the booster shell and partitions the interior thereof into a front negative pressure chamber communicating with a negative pressure source, and a rear operation chamber; a valve cylinder communicating with the booster piston; a valve piston fitted into the valve cylinder to be slidable in a forward and backward direction of the valve piston; an input rod coupling with the valve piston at a front end thereof; a control valve for switching to communicate the operation chamber with either the negative pressure chamber or an air between the valve piston and the valve cylinder, in accordance with the forward and backward movement of the input rod; an output rod slidably fitted into the valve cylinder; and a repulsion force mechanism provided among the valve cylinder, the valve piston and the output rod, and including a flexible piston that is positioned between the valve cylinder and the output rod, a repulsion force piston that is positioned facing the flexible piston on the side opposite the output rod and that has a smaller diameter than the flexible piston, and a spring that is positioned between the repulsion force piston and the valve piston and that imposes a setup load thereon in the direction of contraction.

2. Description of the Related Art

Such a negative pressure booster is already known as disclosed in, for example, Japanese Patent Unexamined Publication No. Hei.10-100887.

In a conventional negative pressure booster, a flange is formed on the outer periphery of the middle portion of the repulsion force piston, and a retainer is coupled with the rear end of the repulsion force piston so as to be slidable in a constant stroke. Between the retainer and the flange, a spring is so arranged that when the spring has been contracted by a predetermined amount, the retainer abuts upon the repulsion force piston, and an input obtained from the input rod is transmitted from the valve piston, through the retainer, to the repulsion force piston and the flexible piston. Thereafter, the output reaches a toggle limit point.

As shown in the output characteristic graph in FIG. 5, in such a conventional negative pressure booster the toggle force ratio, i.e., the ratio of the output to the input, is increased in a region where the spring is contractedly deformed, and is reduced after that region has been passed. Thus, the output characteristic is shifted away from a secondary curve ideal for braking, so that deterioration of the operating function occurs.

SUMMARY OF THE INVENTION

To resolve this problem, it is one objective of the invention to provide a negative pressure booster for approximating the output characteristic of an output rod to a secondary curve ideal for braking until the output reaches the toggle limit point.

To achieve the above objective, according to a first aspect of the invention, a negative pressure booster comprises: a booster shell; a booster piston accommodated inside the booster shell and partitioning the interior thereof into a front negative pressure chamber communicating with a negative pressure source, and a rear operation chamber; a valve cylinder communicating with the booster piston; a valve piston fitted into the valve cylinder to be slidable in a forward and rearward direction of the valve cylinder; an input rod coupling with the valve piston at a front end thereof; a control valve switching communication of the operation chamber with the negative pressure chamber and with air in accordance with a forward and rearward movement of the input rod; an output rod slidably fitted into the valve cylinder; a repulsion force mechanism provided among the valve cylinder, the valve piston and the output rod, the repulsion force mechanism including: a flexible piston interposed between the valve cylinder and the output rod; a repulsion force piston facing the flexible piston on the side opposite the output rod and having a small diameter than the flexible piston; and a spring interposed between the repulsion force piston and the valve piston and imposing a setup load thereon in the contraction direction; and a stopper provided in the valve cylinder and supporting a front end of the valve piston before the spring is reached at the contraction limit.

According to this aspect, when the input provided via the input rod is less than the setup load imposed on the spring while the input rod is moved forward, the output produced by the output rod is increased at a toggle ratio consonant with the ratio of the pressure imposed by the repulsion force piston on a reception area to the pressure imposed by the operating piston that abuts upon the flexible piston, because the input rod and the repulsion piston form a single rigid member.

When the input provided via the input rod exceeds the setup load imposed on the spring, the spring is compressed between the valve piston and the retainer, and one part of the repulsion force that is exerted by the flexible piston on the repulsion force piston is absorbed, so that the toggle ratio seems to be increased.

Since the toggle limit point is reached by bringing the valve piston into contact with the stopper of the valve cylinder before the limit of the contraction of the spring is reached, the reduction of the toggle ratio can be avoided. Thus, for effective braking, at the toggle limit point the output characteristic of the output rod can approximate an ideal secondary curve.

Further, in addition to the first aspect, according to a second aspect of the invention a support shaft projects outward from the front portion of the valve piston, and the spring is positioned between the valve piston and a retainer, which is coupled with the support shaft, so that it slides along the support shaft at a constant stroke distance.

According to this aspect, a coil spring and the retainer, which are small parts, are coupled together with the valve piston to constitute an assembly that communicates with the input rod. Thus, during the assembly of the negative pressure booster, the small coil spring and the retainer can be attached to the valve cylinder, at predetermined locations, at the same time as the input rod is inserted into the valve cylinder. As a result, an efficient assembly process can be implemented.

DETAILED DESCRIPTION OF THE PREFERRED EMBODIMENTS

The preferred embodiment of the invention will now be described while referring to the accompanying drawings.

Figure 1:
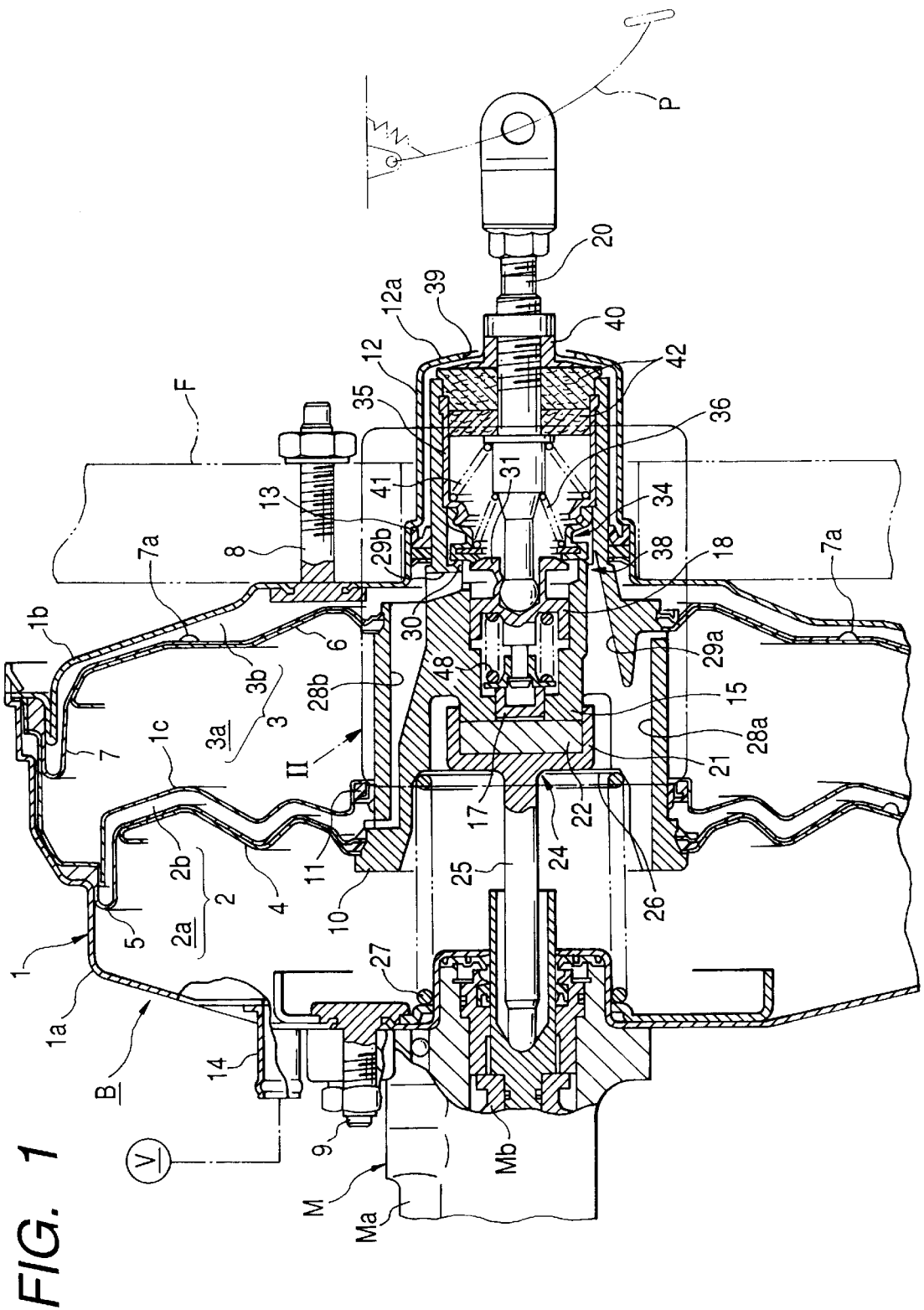
FIG. 1 is a vertical cross-sectional view of a tandem-type negative pressure booster according to one embodiment of the present invention, wherein an input rod is in a quiescent state.
Figure 2:
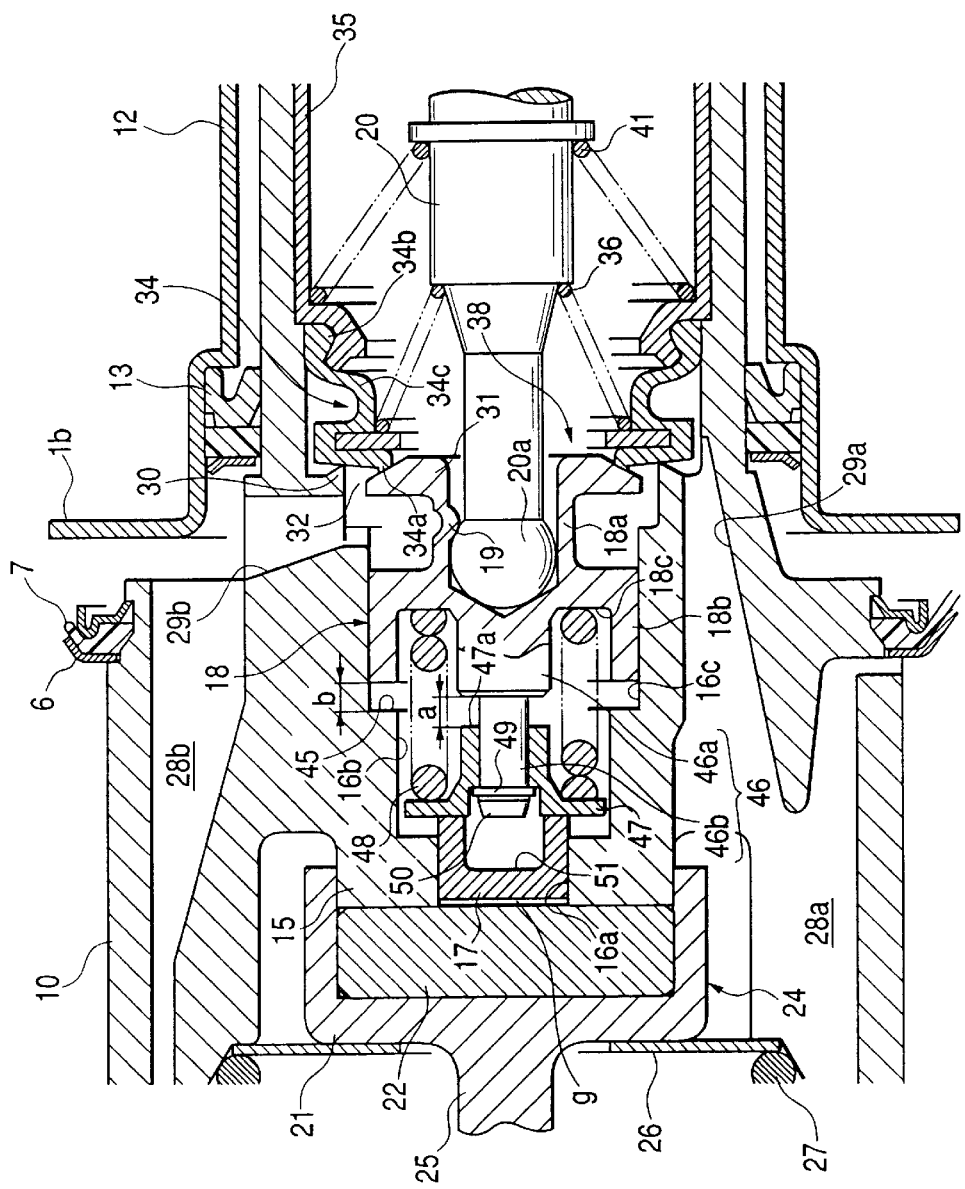
FIG. 2 is an enlarged view showing a portion denoted by reference character II of FIG. 1.

In FIGS. 1 and 2, a booster shell 1 for a negative pressure booster B includes: a pair of front and rear shell hemispheres 1a and 1b, whose opposite ends are coupled with each other; and a partition plate 1c sandwiched between the shell hemispheres 1a and 1b to partition the inside of the booster shell 1 into a front shell chamber 2 and a rear shell chamber 3. The rear shell hemisphere 1b is secured to the front wall F of a vehicle compartment by a bolt 8, and a cylinder body Ma of a master brake cylinder M which is operated by the booster B is fixed to the front shell hemisphere 1a by a bolt 9.

The front shell member 2 is partitioned into a front negative pressure chamber 2a on the front side and a front operation chamber 2b on the rear side by a front booster piston 4, which is mounted to reciprocally move forward and backward within the front shell chamber 2, and a front diaphragm 5, which is coupled with the front booster piston 4 so as to overlap its rear face and sandwiched between the front shell hemisphere 1a and the partition wall 1c. The front negative pressure chamber 2a is connected to a negative pressure source V (e.g., the inside of an intake manifold of an internal combustion engine) through a negative pressure introducing tube 14.

The rear shell chamber 3 is partitioned into a rear negative pressure chamber 3a at the front side and a rear operation chamber 3b at the rear side by a rear booster piston 6, which is mounted to reciprocally move forward and backward, within the rear shell chamber 3, and a rear diaphragm 7, which is coupled together with the rear booster piston 6 so as to overlap its rear face and which, together with the partition plate 1c, is sandwiched between the shell hemispheres 1a and 1b.

The front and rear booster pistons 4 and 6 are annular and are made of steel plate. They are coupled with each other by a valve cylinder 10 of synthetic resin, that is fixed at the center position thereof. The valve cylinder 10 is slidably supported relative to the partition plate 1c via a sealing member 11, and is also slidably supported by a sealing member 13 by a rearward extending tube 12 formed centrally of the rear shell hemisphere 1b. The retraction limit of the booster pistons 4 and 6 is defined when a number of protrusions 7a formed on the rear face of the rear diaphragm 7 are brought into contact with the rear wall of the booster shell 1.

In the valve cylinder 10, there are disposed a valve piston 18, an input rod 20 coupled with the valve piston 18, and a control valve 38, which, in accordance with the forward and backward movement of the input rod 20, switches to communicate the operation chambers 2b and 3b either with the negative pressure chambers 2a and 3a or with the atmosphere.

The valve piston 18 includes a coupling cylindrical part 18a, a piston part 18b that is integrally formed with the front portion of the coupling cylindrical part 18a, and an air introduction valve seat 31 integrally formed with the rear portion of the coupling cylindrical part 18a. A spherical front end 20a of the input rod 20 is fitted into the inside of the coupling cylindrical part 18a, and a part 19 on the coupling cylindrical part 18a is clamped as a stopper. As a result, the input rod 20 is swingably coupled with the valve piston 18.

The valve cylinder 10 includes a first communication path 28a communicating with the front and rear negative pressure chambers 2a and 3a, a second communication path 28b communicating with the front and rear operation chambers 2b and 3b, a first port 29a communicating with the first communication path 28a and opening in the inner periphery of the valve cylinder 10, and a second port 29b communicating with the second communication path 28b and opening in the inner periphery of the valve cylinder 10 before the first port 29a. An annular negative pressure introduction valve seat 30 is formed on the inner periphery of the valve cylinder 10 in the middle portion of the forward and rearward direction of the first and second ports 29a and 29b. A cylindrical valve piston 18 is slidably fitted inside the front of the valve cylinder 10. An annular air introduction seat 31 is formed on the rear of the valve piston 18 and is enclosed by the negative pressure introduction valve seat 30 so as to hold an annular path 32 communicating with the second port 29b. A valve 34 is disposed inside the valve cylinder 10 and faces the negative pressure introduction valve seat 30 and the air introduction valve seat 31 to be commonly contactable with these seats. The valve 34 includes an annular valve portion 34a at the front end thereof, which faces the negative pressure introduction valve seat 30 and the air introduction valve seat 31 so as to seat these seats 30 and 31, an annular attachment bead portion 34b at the rear end, and a diaphragm 34 at the middle portion thereof, which couples the portions 34a and 34b together so that they can be relatively displaced in the axial direction. The attachment bead portion 34b is attached to the front end of a cylindrical valve holder 35, which is fitted into the inner peripheral surface of the valve cylinder 10 at the rear end thereof, so that the valve 34 is attached to the inner peripheral surface of the valve cylinder 10. A valve spring 36 urging the valve portion 34a toward a direction seating at the valve seats 30 and 31 is contractedly provided between the valve portion 34a and the input rod 20.

With the above structure, the valve seats 30 and 31, the valve 34 and the valve spring 36 constitute the control valve 38.

An inward flange 12a with an air introduction inlet 39 opened centrally is integrally formed at the rear end of the rear extending cylinder 12. A stopper plate 40 for defining the retraction limit of the input rod 20 in contact with the inside of the flange 12a is fixed to the input rod 20 to be adjustable in the forward and backward direction. The input rod 20 is urged toward the retraction limit by an input return spring 41 which is supported by a valve holder 35.

An air filter 42 is mounted on the inner periphery of the rear end of the valve cylinder 10. Through the air filter 42, the inner periphery of a first valve seat 30a is always communication with the air introduction inlet 39. The air filter 42 has flexibility so that the forward and backward movement of the input rod 20 relative to the valve cylinder 10, is not impeded.

The valve cylinder 10 is stepwise formed with a small cylinder hole 16a with a small diameter, a medium cylinder hole 16b with a medium diameter, and a large cylinder hole 16c with a large diameter, in order from the front end side.

The valve piston 18 is slidably fitted into the large cylinder hole 16c. A boundary step 45 between the medium cylinder hole 16b and the large cylinder hole 16c is used as a stopper with which the front end surface of the piston 18b of the valve piston 18 is brought into contact at the toggle operation.

At the front end of the piston portion 18b, there are formed a recessed portion 18c and a support shaft 46 projecting from the center of the bottom of the recessed portion 18a. The support shaft 46 includes a large-diameter shaft portion 46a being the base thereof, and a small-diameter shaft portion 46b projecting from the distal end of the large-diameter shaft portion 46a. A boss 47a of a retainer 47, that is positioned inside the medium cylinder hole 16b, is slidably fitted into the small-diameter shaft portion 46b. A coil spring 48 is mounted between the retainer 47 and the bottom of the recessed portion 18a of the piston portion 18b, while a constant setup load is imposed on the spring 48 in the direction of contraction.

A washer 49 for supporting the front end of the boss 47a the retainer 47 is mounted on the distal end of the small-diameter shaft portion 46b. Further, in order to prevent the escape of the washer 49, an extension portion 50 is formed at the distal end of the small-diameter shaft 46b by clamping.

The boss 47a of the retainer 47 can slide along the small-diameter shaft portion 46b between a position whereat the boss 47a is supported by the washer 49 and a position whereat it contacts with the front end of the large-diameter shaft portion 46a. The sliding distance a is set so as to be slightly greater than the distance b between the valve piston 18 and the stopper 45 when the control valve 38 is in the neutral state. The contraction limit of the coil spring 48 is regulated when the boss 47a of the retainer 47 contacts with the front end of the large-diameter shaft poriton 46a. Therefore, according to the setting of the distance a>b, when the input rod 20 is moved forward, the valve piston 18 contacts with the stopper 45 of the valve cylinder 10 before the contraction limit of the coil spring 48 is reached.

The repulsion force piston 17 contacting with the front end of the retainer 47 is slidably fitted into the small cylinder hole 16a. A recessed portion 51 for receiving the distal end of the support shaft 46 when the coil spring 48 is contracted is formed in the rear of the repulsion force piston 17.

An operation piston 15 having a larger diameter than the repulsion force piston 17 is formed in the front end of the valve cylinder 10, and the small cylinder hole 16a is opened in the center of the front face of the operation piston 15. A cup 21 is slidably fitted over the outer periphery of the operation piston 15. In the cup 21, a flat flexible piston 22 is inserted in such a manner as to face the operation piston 15 and the repulsion force piston 17. Then, when the negative pressure booster B is not operated, a perdetemined gap g is defined between the repulsion force piston 17 and the flexible piston 22.

The operation piston 15, the repulsion force piston 17, the flexible piston 22, the coil spring 48 and the cup 21 together constitute a repulsion force mechanism 24, which transmits to the output rod 25, a combined force consisting of that the input to the input rod 20 and the thrust forces produced by the booster pistons 4 and 6.

The output rod 25 protrudes from the front face of the cup 21, and is connected to a piston Mb in the brake master cylinder M. A retainer 26 is also disposed such as to contact with the cup 21 and the front end face of the valve cylinder 10, and a valve return spring 27 is contractedly disposed between the retainer 26 and the front wall of the booster shell 1.

A description will now be given for the operation for this embodiment.

As is shown in FIG. 1, when the negative pressure booster B is in a quiescent state, the input rod 20 is positioned at the retraction limit. The control valve 38 is in the neutral state when the valve 34 is seated on the air introduction valve seat 31 and the negative pressure introduction valve seat 30, so that the operation chambers 2b and 3b do not communicate with the negative pressure chambers 2a and 3b and the air introduction inlet 39. By such a control valve 38, a negative pressure from a negative pressure source, which is supplied through the negative pressure introduction tube 14, is stored in the negative pressure chambers 2a and 3a, while a negative pressure that is suitably diluted with air is held in the operation chambers 2b and 3b. As a result, a small advance force, which is produced by a slight pressure difference either between the front negative pressure chamber 2a and the operation chamber 2b or between the rear negative pressure chamber 3b and the operation chamber 3b, is exerted on the front and rear booster pistons 4 and 6. The advance force and the force exerted by the valve return spring 27 are balanced, so that the booster pistons 4 and 6 are halted at a position slightly in advance of the retraction limit.

When a driver of a vehicle steps on the brake pedal P to brake the vehicle and then the input rod 20 is advanced, the valve piston 18 is also advanced. Since the booster pistons 4 and 6 are initially immovable, the air introduction valve seat 31 is separated from the valve 34 by moving the valve piston 18 forward, and the second port 29b communicates with the air introduction inlet 39 via the annular communication path 32 and the valve 34. As a result, air that has entered the valve cylinder 10 through the air introduction inlet 39 passes through the air introduction valve seat 31 and is swiftly introduced into the operation chambers 2b and 3b via the second port 29b. Thus, the pressure is boosted in both chambers 2b and 3b so that it is higher than that in the negative pressure chambers 2a and 3a, and based on this pressure difference, a strong forward thrust is obtained. As a result, together with the valve cylinder 10 and the operation piston 15, the booster pistons 4 and 6 advance with good response to the movement of the input rod 20 against the force exerted by the valve return spring 27. The operation piston 15 drives the cup 21 via the flexible piston 22, i.e., impels the output rod 25 forward to drive the piston Mb of the brake master cylinder M. Accordingly, the individual wheel cylinders of the vehicle are operated to thereby brake the vehicle.

As is shown in FIG. 2, the predetermined gap g is initially formed between the repulsion force piston 17 and the flexible piston 22. When the flexible piston 22 is compressed by the repulsion force as the output rod 25 is moved, the flexible piston 22 partially enters the small cylinder hole 16a. Therefore, the repulsion force provided by the output rod 20 is not transmitted to the input rod 20 until the repulsion force piston 17 advancing with the input rod 20 is brought into contact with a part of the flexible piston 22. The output provided by the output rod 25 shows the jumping characteristic that rises dramatically as indicated by line a-b in FIG. 4, and a useless gap in the master cylinder M or in a wheel cylinder can be eliminated at an early stage.

After the repulsion force piston 17 contacts the flexible piston 22, the thrust force of the booster pistons 4 and 6 exerted on the operation piston 15, and the depression force (input) of the driver exerted from the input rod 20 via the valve piston 18 and the coil spring 48 on the repulsion force piston 17 act on the rear end of the flexible piston 22.

Further, the operation repulsion force of the output rod 25 acts on the front end of the flexible piston 22, and a part of the operation force of the output rod 25 is transmitted via the flexible piston 22 to the input rod 20.

Figure 4:
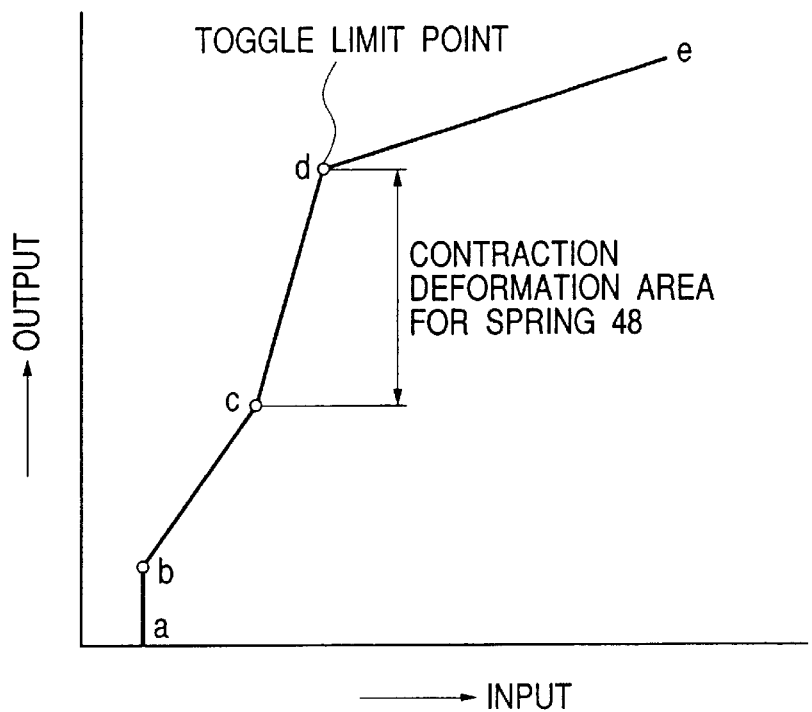
FIG. 4 is a graph showing the toggle characteristic of the negative pressure booster.
Figure 5:
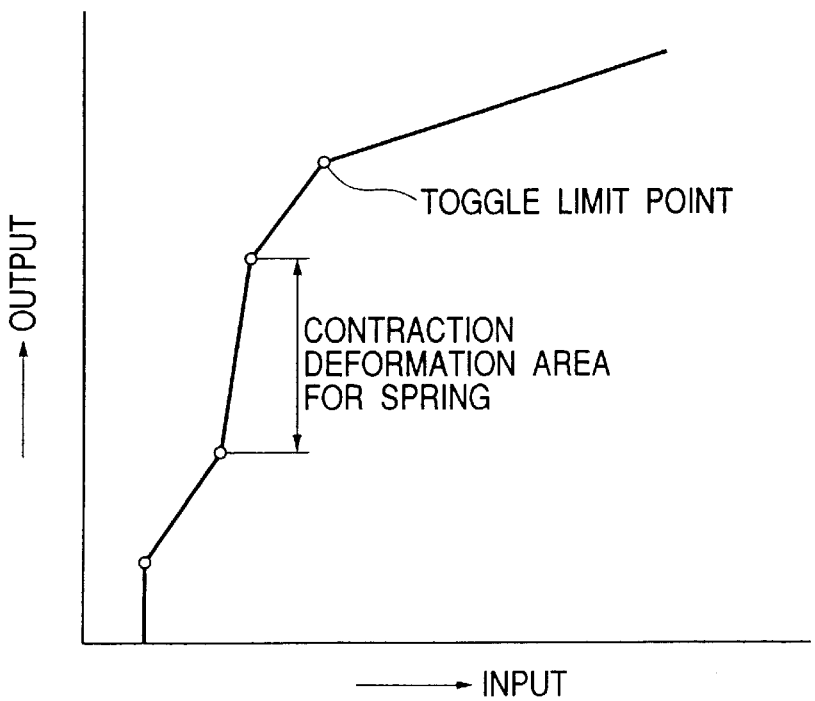
FIG. 5 is a graph showing the toggle characteristic of a conventional negative pressure booster.

So long as strength of the input at the input rod 20 is less than the setup load imposed on the coil spring 48, since the input rod 20 and the repulsion force piston 17 constitute a single rigid member, the output at the output rod 25 is increased at a toggle ratio that is consonant with the ratio of pressure-receiving areas of the operation piston 15 and the repulsion force piston 17, which are abutted to the flexible piston 22, as indicated by line b-c in FIG. 4. Thus, the driver suitably feels the magnitude of the output produced by the output rod 25.

When the strength of the input at the input rod 20 exceeds the setup load of the coil spring 48, the coil spring 48 is compressed and deformed between the valve piston 18 and the retainer 47, and accordingly, the transmission of the repulsion force from the repulsion force piston 17 to the valve piston 18 is attenuated. Therefore, the toggle ratio is increased, and the output by the output rod 25 is increased as indicated by line c-d in FIG. 4.

Figure 3:
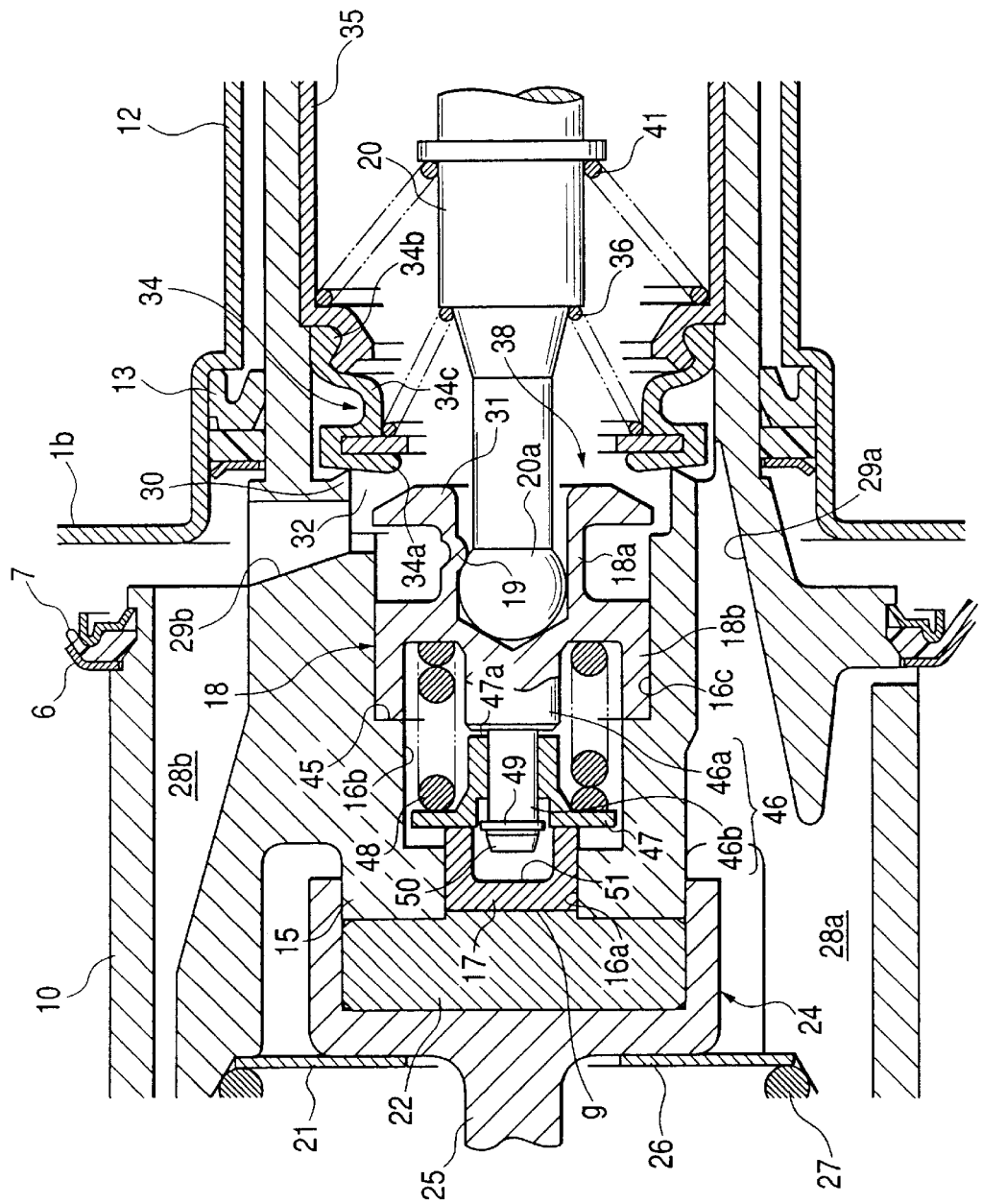
FIG. 3 is a explanation view of an operation corresponding to FIG. 2, showing the toggle limit state for the negative pressure booster.

When the output has reached the toggle limit point d, whereat the fully open state of the air introduction valve seat 31 is continued, as is shown in FIG. 3, the front end of the valve piston 18 contacts with the stopper 45 of the valve cylinder 10, and then, the boss 47a of the retainer 47 impelled rearward by the repulsion force piston 17 is pressed against the large-diameter shaft portion 46a of the support shaft 46 of the valve piston 18.

Therefore, the output characteristic of the output rod 25 from the jumping point b to the toggle limit point d is approximately equal to the secondary curve ideal for effective braking.

After the toggle limit point d passed, as indicated by line d-e in FIG. 4, the output of the output rod 25 is the sum of the maximum thrust force produced by a pressure difference between the booster pistons 4 and 6, and the strength of the input at the input rod 20.

The coil spring 48 and the retainer 47, which are small parts, are fitted to the support shaft 46 of the valve piston 18 coupled with the input rod 20, and together with the input rod 20 constitute an assembly. Thus, during the assembly of the negative pressure booster B, the coil spring 48 and the retainer 47 can be mounted at predetermined positions on the valve cylinder 10 at the same time as the input rod 20 is inserted into the valve cylinder 10. As a result, an efficient assembly operation can be implemented.

Before the flexible piston 22 is mounted, the small, independent repulsion force piston 17 can be easily inserted into the small cylinder hole 16a from the front side of the valve cylinder 10.

In addition, since the recessed portion 51, which accepts the distal end of the support shaft 46 at the time of the contraction of the coil spring 48, is formed in the rear end of the repulsion force piston 17. Thus, a satisfactory load bearing length of the support shaft 46 for the boss 47a of the retainer 47 is ensured, and interference with the support shaft 46 and the repulsion force piston 17 can be avoided.

Further, the coil spring 48 is mounted between the retainer 47 and the bottom of the recessed portion 18a in the front end of the valve piston 18, and a part of the spring 48 is accommodated in the recessed portion 18a. Thus, the comparatively long coil spring 48 can be located in the narrow space between the valve piston 18 and the retainer 47, and the spring constant can be reduced.

When the driver releases the depressing force from the brake pedal P in order to halt the braking of the vehicle, first, the input rod 20 and the valve piston 18 are retracted by the force exerted by the input return spring 41. In accordance with this, the valve piston 18 cause the valve 34 to largely separate from the negative pressure introduction valve seat 30 while seating the air introduction valve seat 31 at the valve 34. Therefore, the operation chambers 2b and 3b can communicate with the negative pressure chambers 2a and 3a via the second port 29b, the annular communication path 32 and the first port 29a. As a result, the introduction of air into the operation chambers 2b and 3b is prevented. On the other hand, the air that is in the operation chambers 2b and 3b is absorbed in the negative pressure source V via the negative pressure chambers 2a and 3a, to thereby eliminate any pressure difference. And thus, since the booster pistons 4 and 6 are also retracted by the valve return spring 27, the operation of the master cylinder M is canceled.

When the input rod 20 is retracted to a retraction limit that the stopper plate 40 is brought into contact with the inward flange 12a of the rear extending cylinder 12, the rear booster piston 6 is temporarily returned to the limit of the retraction, whereupon the protrusion 7a of the rear diaphragm 7 is brought into contact with the rear wall of the booster shell 1. Then, since the negative pressure valve seat 30 is seated at the valve 34, and the valve 34 is separated from the air introduction valve seat 31, the air is again introduced into the operation chambers 2b and 3b. In addition, since the booster pistons 4 and 6 advance slightly due to an air pressure difference that is generated by the introduced air, the negative pressure valve seat 31 is also seated at the valve 34 and thus, the control valve 38 is set to its original neutral state. In this manner, a negative pressure that has been diluted with air is held in the operation chambers 2a and 3b, and the negative booster B is set so it is in a quiescent state, as shown in FIGS. 1 and 2.

The present invention is not limited to this embodiment, and can be variously modified without departing from the scope of the invention. For example, the negative booster B can be single-type using only one booster piston. Further, the stopper plate 40 for the input rod 20 and the inward flange 12a of the rear extending cylinder 12 may be not used, and when the negative pressure booster B is in a quiescent state, the negative pressure introduction valve seat 30 may be held open so that the operation chambers 2b and 3b communicate with the negative pressure chambers 2a and 3a.

As is described above, according to the first aspect of the invention, a negative pressure booster includes: a booster shell; a booster piston, which is accommodated inside the booster shell, that functions as a partition and divides the interior of the booster shell into a front negative pressure chamber, which communicates with a negative pressure source, and a rear operation chamber; a valve cylinder, which communicates with said booster piston; a valve piston, which is fitted into said valve cylinder and which can slide forward and backward; an input rod, which couples together the front and said valve piston; a control valve, through which, in accordance with the forward and backward movement of said input rod, said operation chamber communicates with either said negative pressure chamber or an air space between said valve piston and said valve cylinder; an output rod, which is fitted into and slides inside the valve cylinder; a repulsion force mechanism, which is provided for said valve cylinder, said valve piston and said output rod, and which includes a flexible piston that is located between said valve cylinder and said output rod, a repulsion force piston that is positioned facing said flexible piston on the side opposite said output rod and that has a smaller diameter than said flexible piston, and a spring that is positioned between said repulsion piston and said valve piston and that imposes a setup load thereon in the contraction direction; and a stopper, which is provided for said valve cylinder to support the front end of said valve piston before the limit of the contraction of said spring is reached. When the stopper provided for the valve cylinder holds the front of the valve piston, the toggle ratio is reduced less, and the output characteristic of the output rod can approximate the ideal secondary curve for braking. As a result, operability can be improved.

In addition, according to the second aspect, the support shaft projects outward from the front of the valve piston, and the spring is arranged between the valve piston and the retainer, which is coupled together with the support shaft, so that it slides along the support shaft at a constant stroke distance. The coil spring and the retainer, which are small parts, together with the input rod constitute an assembly. Thus, during the assembly process, the negative pressure booster, the small coil spring and the retainer can be attached to the valve cylinder at predetermined locations at the same time the input rod is inserted into the valve cylinder. As a result, an efficient assembly operation can be implemented.

What is claimed is:

1. A negative pressure booster comprising:
   a booster shell;
   a booster piston accommodated inside the booster shell and partitioning the interior thereof into a front negative pressure chamber communicating with a negative pressure source, and a rear operation chamber;
   a valve cylinder communicating with the booster piston;
   a valve piston fitted into the valve cylinder to be slidable in a forward and rearward direction of the valve cylinder;
   an input rod coupling with the valve piston at a front end thereof;
   a control valve switching communication of the operation chamber with the negative pressure chamber and with air in accordance with a forward and rearward movement of the input rod;
   an output rod slidably fitted into the valve cylinder;
   a repulsion force mechanism provided among the valve cylinder, the valve piston and the output rod, the repulsion force mechanism including:
      a flexible piston interposed between the valve cylinder and the output rod;
      a repulsion force piston facing the flexible piston on the side opposite the output rod and having a smaller diameter than the flexible piston;
      a spring interposed between the repulsion force piston and the valve piston and imposing a setup load thereon in the contraction direction; and
      a stopper provided in the valve cylinder and supporting a front end of the valve piston before the spring reaches the contraction limit thereof.

2. A negative pressure booster comprising:
   a booster shell;
   a booster piston accommodated inside the booster shell and partitioning the interior thereof into a front negative pressure chamber communicating with a negative pressure source, and a rear operation chamber;
   a valve cylinder communicating with the booster piston;
   a valve piston fitted into the valve cylinder to be slidable in a forward and rearward direction of the valve cylinder;
   an input rod coupling with the valve piston at a front end thereof;
   a control valve switching communication of the operation chamber with the negative pressure chamber and with air in accordance with a forward and rearward movement of the input rod;
   an output rod slidably fitted into the valve cylinder;
   a repulsion force mechanism provided among the valve cylinder, the valve piston and the output rod, the repulsion force mechanism including:
      a flexible piston interposed between the valve cylinder and the output rod;
      a repulsion force piston facing the flexible piston on the side opposite the output rod and having a smaller diameter than the flexible piston;
      a spring interposed between the repulsion force piston and the valve piston and imposing a setup load thereon in the contraction direction;
      a stopper provided in the valve cylinder and supporting a front end of the valve piston before the spring reaches the contraction limit thereof;
      a support shaft projecting from the front end of the valve piston; and
      a retainer coupled with the support shaft to be slidable along the support shaft at a predetermined stroke, wherein the spring is contractedly positioned between the valve piston and the retainer.

3. A negative pressure booster according to claim 2, wherein the valve piston includes an annular piston portion having the front end contactable with the stopper, and a recessed portion receiving a part of the spring formed between the piston portion and the support shaft.

4. A negative pressure booster according to claim 2, wherein the retainer includes a boss portion surrounding around the support shaft and a flange portion contactable with one end of the spring.

5. A negative pressure booster according to claim 2, wherein the repulsion force piston is formed with a recessed portion receiving a tip end of the support shaft.

* * * * *